(12) United States Patent
Levi et al.

(10) Patent No.: US 11,288,174 B2
(45) Date of Patent: Mar. 29, 2022

(54) TESTING A CODE USING REAL TIME ANALYSIS

(71) Applicant: Applied Materials Israel Ltd., Rehovot (IL)

(72) Inventors: Elad Levi, Rehovot (IL); Moshe Herskovits, Nes Ziona (IL)

(73) Assignee: Applied Materials Israel Ltd., Rehovot (IL)

( * ) Notice: Subject to any disclaimer, the term of this patent is extended or adjusted under 35 U.S.C. 154(b) by 60 days.

(21) Appl. No.: 16/795,209

(22) Filed: Feb. 19, 2020

(65) Prior Publication Data
US 2021/0255946 A1  Aug. 19, 2021

(51) Int. Cl.
*G06F 11/36* (2006.01)

(52) U.S. Cl.
CPC ........ *G06F 11/3688* (2013.01); *G06F 11/368* (2013.01); *G06F 11/3684* (2013.01); *G06F 11/3692* (2013.01)

(58) Field of Classification Search
CPC ............. G06F 11/3688; G06F 11/3692; G06F 11/368; G06F 11/3684
See application file for complete search history.

(56) References Cited

U.S. PATENT DOCUMENTS

| | | | |
|---|---|---|---|
| 9,710,367 B1 * | 7/2017 | Nagineni | G06F 11/3684 |
| 10,922,217 B1 | 2/2021 | Levi et al. | |
| 2013/0019126 A1 * | 1/2013 | Frohlich | G06F 11/3688 714/38.1 |
| 2014/0096111 A1 * | 4/2014 | Mahler | G06F 11/3688 717/124 |
| 2016/0162392 A1 * | 6/2016 | Hu | G06F 11/3684 714/38.1 |
| 2018/0089058 A1 * | 3/2018 | Anantharam | G06F 11/3692 |
| 2019/0018761 A1 * | 1/2019 | Ramraz | G06F 11/3676 |
| 2021/0295499 A1 | 9/2021 | Levant et al. | |

* cited by examiner

*Primary Examiner* — Wei Y Zhen
*Assistant Examiner* — Amir Soltanzadeh
(74) *Attorney, Agent, or Firm* — Kilpatrick Townsend & Stockton LLP

(57) ABSTRACT

A method, non-transitory computer readable medium and a computerized system for testing a code using real time analysis. The method can include (i) executing a group of test cases while performing real time analysis to find a set of overlapping code segments (OCSs), input values that are fed, during the executing of the group, to each one of the set of OCSs, and output values that are outputted from each one of the OCSs during the execution of the group, (ii) generating, for at least some of the OCSs, at least one OCS test for testing each of the at least some OCSs, wherein the generating is based, at least in part, on the input values and the output values, (iii) determining an evaluation process of the code that includes executing one or more OCS tests for testing one or more OCSs, (iv) evaluating the code by executing the evaluation process.

19 Claims, 4 Drawing Sheets

| Overlapping code segment 221 | Included in code coverage of test cases 222 | Input during execution of group of test cases 223 | Output during execution of group of test cases 224 | Weight 225 |
|---|---|---|---|---|
| OSC1 211 | A,B,C,D | IA1, IB1, IC1, ID1 | OA1, OB1, OC1, OD1 | 4 |
| OSC4 214 | B,C,E | IB3, IC3, IE3 | OB3, OC3, OE3 | 3 |
| OSC2 212 | A,C | IA2, IC2 | OA2, OC2 | 2 |

TABLE 220

| Overlapping code segment 231 | Overlapping code segment test (OCST) name 232 | Input during OCST 233 | Expected output during OCST 234 | Weight 225 |
|---|---|---|---|---|
| OSC1 211 | OCST_1 | Based on at least part of IA1, IB1, IC1, ID1 | Based on at least part of OA1, OB1, OC1, OD1 | 4 |
| OSC4 214 | OCST_4 | Based on at least part of IB3, IC3, IE3 | Based on at least part of OB3, OC3, OE3 | 3 |
| OSC2 212 | OCST_2 | Based on at least part of IA2, IC2 | Based on at least part of OA2, OC2 | 2 |

Suggested OCST 230

FIG. 3

| Test runner 302 | Monitor 304 | Test builder 306 | Code evaluator 308 |

TESTING A CODE USING REAL TIME ANALYSIS

BACKGROUND OF THE INVENTION

As software is updated or changed, or reused on a modified target, emergence of new faults and/or re-emergence of old faults is quite common. Sometimes re-emergence occurs because a fix gets lost through poor revision control practices (or simple human error in revision control). Often, a fix for a problem will be "fragile" in that it fixes the problem in the narrow case where it was first observed but not in more general cases which can arise over the lifetime of the software. Frequently, a fix for a problem in one area inadvertently causes a software bug in another area. Finally, it can happen that, when some feature is redesigned, some of the same mistakes that were made in the original implementation of the feature are made in the redesign (See: www.wikipedia.org).

Therefore, in most software development situations, it is considered good coding practice, when a bug is located and fixed, to record a test that exposes the bug and re-run that test regularly after subsequent changes to the program. Although this can be done through manual testing procedures using programming techniques, it is often done using automated testing tools. Such a test suite contains software tools that allow the testing environment to execute all the regression test cases automatically; some projects even set up automated systems to re-run all regression tests at specified intervals and report any failures (which could imply a regression or an out-of-date test). Common strategies are to run such a system after every successful compile (for small projects), every night, or once a week. Those strategies can be automated by an external tool.

Regression testing includes re-running functional and non-functional tests to ensure that previously developed and tested software still performs after a code or hardware change. For example, changes that can require regression testing include bug fixes, software enhancements, configuration changes, and even substitution of electronic components. As regression test suites tend to grow with each found defect, test automation is frequently involved.

Regression testing is an integral part of the extreme programming software development method. In this method, design documents are replaced by extensive, repeatable, and automated testing of the entire software package throughout each stage of the software development process. Regression testing is done after functional testing has concluded, to verify that the other functionalities are working.

In the corporate world, regression testing has traditionally been performed by a software quality assurance team after the development team has completed work. However, defects found at this stage are most costly to fix. This problem is being addressed by the rise of unit testing. Although developers have always written test cases as part of the development cycle, these test cases have generally been either functional tests or unit tests that verify only intended outcomes. Developer testing compels a developer to focus on unit testing and to include both positive and negative test cases.

Due to the expensive nature of the "retest all" technique, Regression Test Selection should be performed. In this technique instead of rerunning the whole test suite—a selection of which part of a test suite to rerun.

Nevertheless, the selection of the part of the test suite requires to run the selected test cases.

There is a growing need to provide a testing scheme that requires less resources and time.

BRIEF SUMMARY OF THE INVENTION

Some embodiments of the disclosure provide a method, non-transitory computer readable medium and a computerized system for testing a code using real time analysis. The testing of the code can be a part of regression tests or may not be included in regression tests.

BRIEF DESCRIPTION OF THE DRAWINGS

The subject matter regarded as the embodiments of the disclosure is particularly pointed out and distinctly claimed in the concluding portion of the specification. The embodiments of the disclosure, however, both as to organization and method of operation, together with objects, features, and advantages thereof, can best be understood by reference to the following detailed description when read with the accompanying drawings in which:

FIG. 3 illustrates an example of data structures that include a table and suggested overlapping code segment tests; and FIG. 4 illustrates an example of a system.

DETAILED DESCRIPTION OF THE INVENTION

Figure 1:
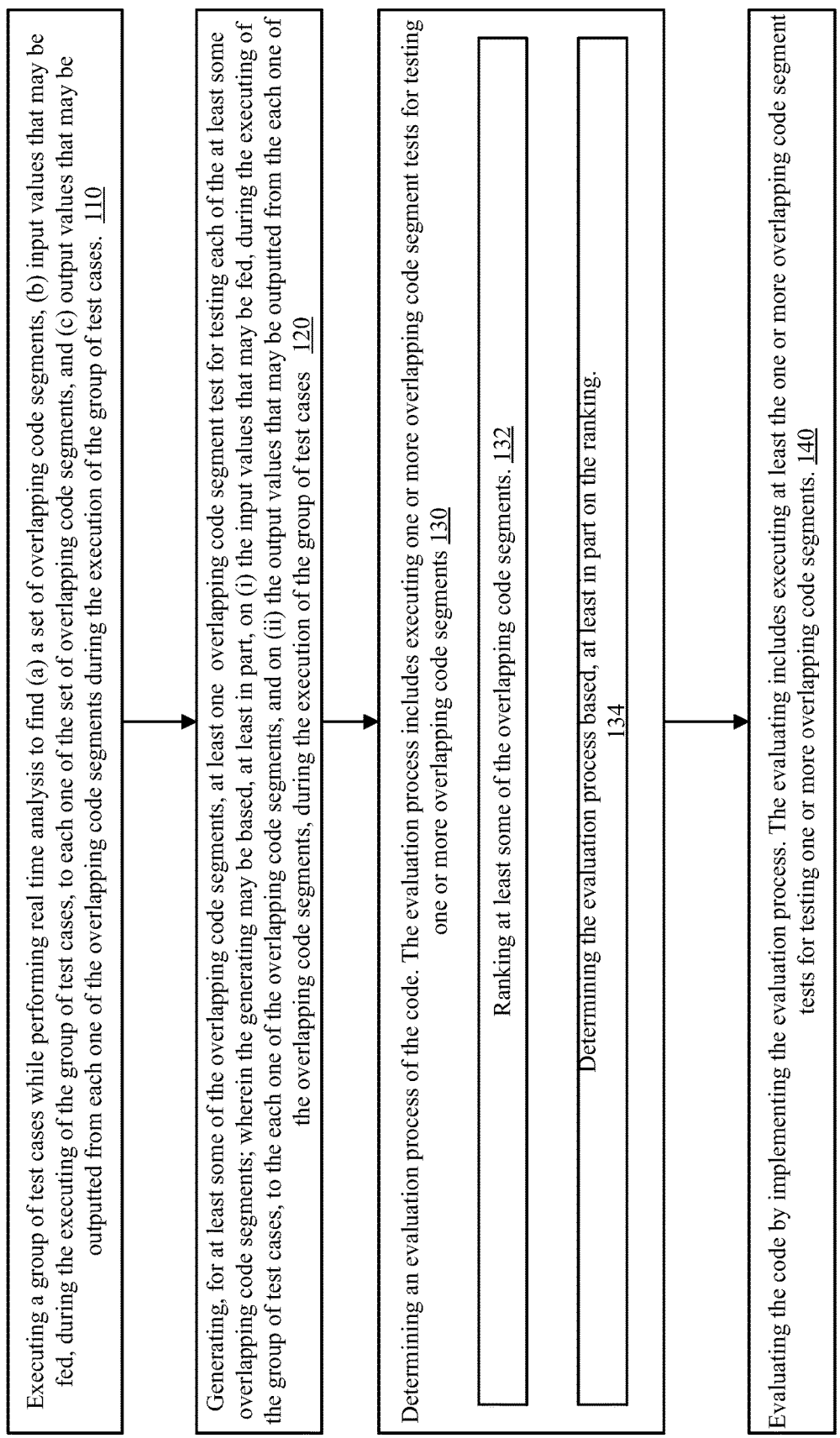
FIG. 1 illustrates an example of a method.

In the following detailed description, numerous specific details are set forth in order to provide a thorough understanding of the embodiments of the disclosure.

However, it will be understood by those skilled in the art that the present embodiments of the disclosure can be practiced without these specific details. In other instances, well-known methods, procedures, and components have not been described in detail so as not to obscure the present embodiments of the disclosure.

The subject matter regarded as the embodiments of the disclosure is particularly pointed out and distinctly claimed in the concluding portion of the specification. The embodiments of the disclosure, however, both as to organization and method of operation, together with objects, features, and advantages thereof, can best be understood by reference to the following detailed description when read with the accompanying drawings.

It will be appreciated that for simplicity and clarity of illustration, elements shown in the figures have not necessarily been drawn to scale. For example, the dimensions of some of the elements can be exaggerated relative to other elements for clarity. Further, where considered appropriate, reference numerals can be repeated among the figures to indicate corresponding or analogous elements.

Because the illustrated embodiments of the disclosure can for the most part, be implemented using electronic components and circuits known to those skilled in the art, details will not be explained in any greater extent than that considered necessary as illustrated above, for the understanding and appreciation of the underlying concepts of the present embodiments of the disclosure and in order not to obfuscate or distract from the teachings of the present embodiments of the disclosure Any reference in the specification to a method should be applied mutatis mutandis to a system capable of executing the method and should be applied mutatis mutandis to a computer readable medium that is non-transitory and stores instructions for executing the method.

Any reference in the specification to a system should be applied mutatis mutandis to a method that can be executed by the system and should be applied mutatis mutandis to a computer readable medium that is non-transitory and stores instructions executable by the system.

Any reference in the specification to a computer readable medium that is non-transitory should be applied mutatis mutandis to a method that can be applied when executing instructions stored in the computer readable medium and should be applied mutatis mutandis to a system configured to execute the instructions stored in the computer readable medium.

The term "and/or" means additionally or alternatively.

There is provided a system, a method, and a non-transitory computer readable medium for a testing a code using real time analysis.

FIG. 1 illustrates an example of method 100. Method 100 can be executed by a computerized system that includes one or more processing circuits and one or more memory modules. A processing circuit can be a hardware accelerator, a general purpose unit, a central processing unit (CPU), a system on chip (SOC), an image processor, a graphic processing unit (GPU), a field programmable gate array (FPGA), an application specific integrated circuit (ASIC), a neural network processor, and the like.

The computerized system can be a complex computerized system. It should be noted that the source code can be executed by any other type of computerized systems—including a simple computerized system, a computerized system in which one or few entities can access data, and the like. Non-limiting examples of complex computerized systems can include evaluation tools such as a metrology tool, an inspection tool, a review tool, a scanning electron microscope, a charged particle imager, an automatic optical inspection system, a testing farm that includes multiple tools, and like. An example of a tool manufacturing company is Applied Materials INC. of Santa Clara, USA.

Method 100 can start by step of 110 of executing a group of test cases while performing real time analysis to find (a) overlapping code segments, (b) input values that can be fed, during the executing of the group of test cases, to each one of the set of overlapping code segments, and (c) output values that can be outputted from each one of the overlapping code segments during the execution of the group of test cases.

The group of test cases can include tens of test cases, hundreds of test cases, thousands of test cases and even more. The duration of execution a test case can vary between one test case to another and can range between few minutes to more than a few hours.

An overlapping code segment can be independently testable and accessed during an execution of two or more test cases of the group of test cases. Independently testable means that a code segments can be tested without testing other parts of the code. The overlapping code segments can be independently executable, but this is not necessarily so. Non-limiting examples of an independently testable code segment is a function, a module and a class.

The real time analysis involves monitoring, in real time, the execution of the group of case tests.

Step 110 can be followed by step 120 of generating, for at least some of the overlapping code segments, at least one overlapping code segment test for testing each of the at least some overlapping code segments. The generating can be based, at least in part, on (i) the input values that were fed, during the executing of the group of test cases, to the each one of the at least some of the overlapping code segments, and on (ii) the output values that was outputted from the each one of the at least some overlapping code segments, during the execution of the group of test cases.

The at least some of the overlapping code segments can include all of the overlapping code segments, a majority of the overlapping code segments, a minority of the code segments, and the like.

Step 120 can include generating an overlapping code segment test to include (i) feeding an overlapping code segment with at least some of the input values that were fed, during the executing of the group of test cases, to the overlapping code segment; and (ii) receiving and/or recording outputs from the overlapping code segment.

Step 120 can also include determining expected output values to be outputted during an execution of an overlapping code segment test. The expected output values can be determined based, at least in part, on the output values that were outputted from the overlapping code segment, during the execution of the group of test cases. For example, the expected output values can be at least some of the output values detected in step 110. Substantial deviations from these output values can indicate of a test failure. What amount to be substantial can be determined in any manner.

Step 120 can be followed by step 130 of determining an evaluation process of the code. Step 130 can include determining to execute one or more overlapping code segment tests for testing one or more overlapping code segments. The one or more overlapping code segments can include the at least some of the overlapping code segments, for example it can include all of the overlapping code segments, a majority of the overlapping code segments, a minority of the code segments, and the like.

Step 130 can include determining to execute an overlapping code segment test instead of executing two or more test cases having a code coverage that included the overlapping code segment.

Step 130 can include determining to execute an overlapping code segment test and determining whether or not to execute of two or more test cases having a code coverage that include the overlapping code segment—based on a success or failure of the overlapping code segment test.

a. For example, step 130 can include determining to execute an overlapping code segment test and to avoid executing of two or more test cases having a code coverage that include the overlapping code segment, when the overlapping code segment test fails.
  b. Yet for another example, step 130 can include determining to execute an overlapping code segment test and to determine whether or not to execute of two or more test cases having a code coverage that include the overlapping code segment, when the overlapping code segment test succeeds.

It should be noted that step 130 can include performing different decisions regarding the execution of test cases in relation to the success or failure of overlapping code segment test associated with these test cases. A test case is associated with an overlapping code segment test when a code coverage of the test case includes an overlapping code segment that is tested by the overlapping code segment test.

For example, step 130 can include determining to avoid executing one or more first test cases associated with a first overlapping code segment test—when the first overlapping code segment test fails, while determining to execute one or more second test cases associated with a second overlapping code segment test—even the second overlapping code segment test fails Step 130 can also include determining to execute a non-overlapping code segment test that is accessed only during an execution of a single test case. This can provide a better coverage of the group of test cases. Step 130 can also include determining to execute one or more test cases of the group of test cases in addition to the execution of one or more overlapping code segment tests.

Step 130 can include step 132 of ranking at least some of the overlapping code segments. The ranking can be based on numbers of test cases of the group of test cases that once executed accessed the overlapping code segments. For example—assuming that there are a plurality (Q) of code segments and that the first till Q'th overlapping code segments are accessed during the execution of N1 till NQ test cases respectively (for q between 1 and Q—the q'th overlapping code segment was accessed, during step 110, by Nq test cases), then the ranking can be based on (at least) the values of N1 till NQ—where the overlapping code segment with the highest value access number can be ranked first.

The ranking can be also based on at least one parameter that differs from the numbers of test cases of the group of test cases that once executed accessed the overlapping code segments. The at least one parameter can include a number of bugs found in the test cases of the group (the number of bugs can be compared to number of bugs found in other overlapping code segments), a priority assigned to the test cases of the group (the priorities can be assigned by a user, by a process that does not belong to method 100, and the like).

Step 130 can also include step 134 of determining the evaluation process based, at least in part on the ranking. Step 134 can include prioritizing the execution of overlapping code segments tests based, at least in part, on the ranking of the overlapping code segments tested by the overlapping code segments tests.

Step 134 can include determining an order of an execution of overlapping code segments tests based, at least in part, on the ranking. Step 134 can include selecting to execute at least some of the overlapping code segments tests based, at least in part, on the ranking. Step 134 can be responsive to time and/or resource constraints.

Step 130 can be followed by step 140 of evaluating the code by executing at least the one or more overlapping code segment tests for testing one or more overlapping code segments. Step 140 implements the evaluation process of the code determined in step 130.

The duration of the executing of an overlapping code segment test can be shorter that an aggregate duration of the executing of two or more test cases.

Step 110 can be relatively long and resource consuming, especially when executing the entire test cases related to a code. The duration of step 110 is expected to be much longer than the duration of step 140. In many cases, multiple iterations of step 140 are executed per a single execution of step 110. For example, step 110 can be executed once per quarter (3 months), while step 140 can be executed on a weekly basis. Method 100 can be executed when a new code is loaded, when a code is updated, and the like.

Figure 2:
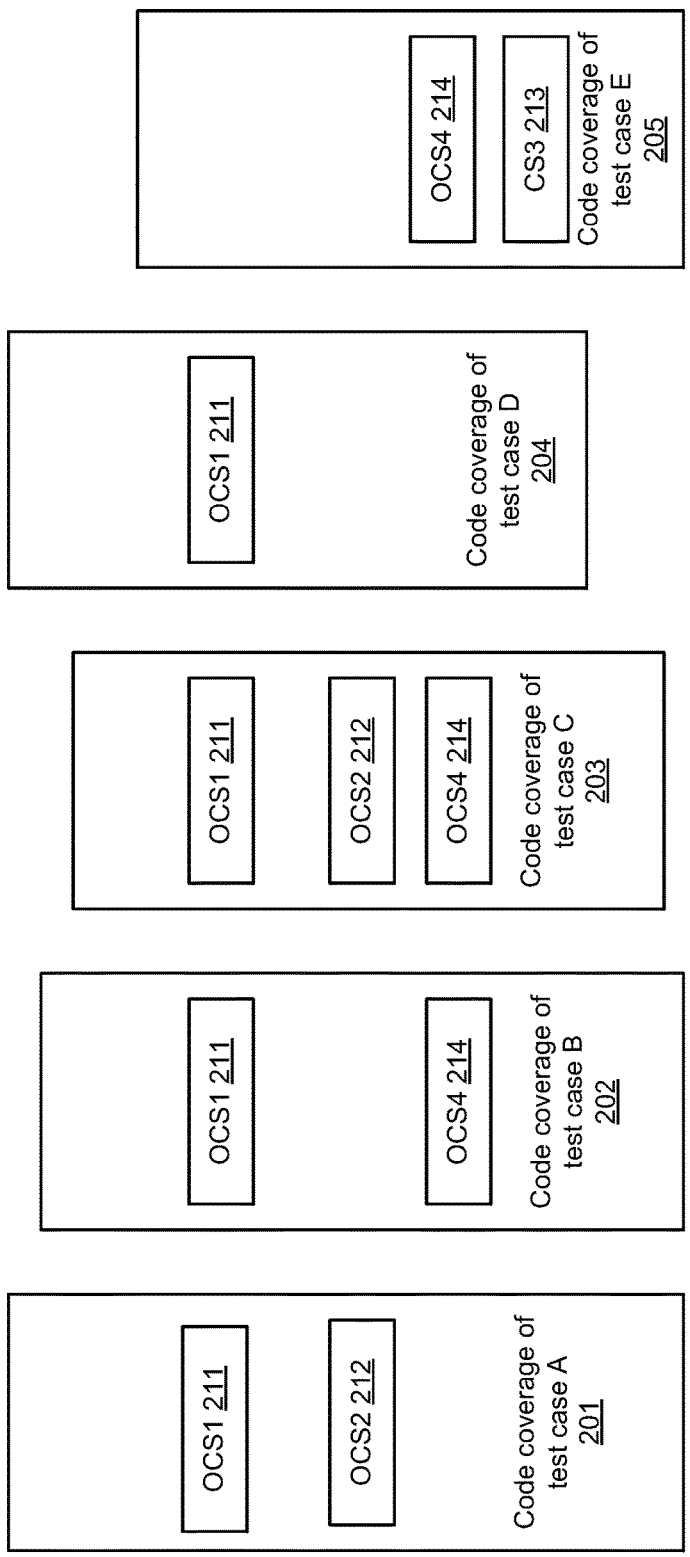
FIG. 2 illustrates an example of an example of code coverages of five different test cases that include overlapping code segments and a non-overlapping code segment.

FIG. 2 is an example of code coverages of five different test cases that include overlapping code segments and a non-overlapping code segment. The number of test cases can differ from five. The numbers and distribution of overlapping code segments and the non-overlapping code segment can differ from the numbers and distribution illustrated in FIG. 2.

The code coverages include a first code coverage of test case A 201, a second code coverage of test case B 202, a third code coverage of test case C 203, a fourth code coverage of test case D 204, and a fifth code coverage of test case E 205.

First overlapping code segment (OCS1) 211 is included in first, second, third and fourth code coverages. Second overlapping code segment (OCS2) 212 is included in first and third code coverages. A third code segment (CS3) 213 appears only in the fifth code coverage. Fourth overlapping code segment (OCS4) 214 is included in second and third code coverages.

FIG. 3 illustrates an example of a table 220 that includes information about overlapping code segments, inputs and outputs related to the overlapping code segments, and ranks of the overlapping code segments. Table 220 includes the following columns—overlapping code segments 221, code coverage 222 of which tests cases that included the overlapping code segment, input fed to the overlapping code segments during the execution of the group of test cases 223, output from the overlapping code segments during the execution of the group of test cases 224, and a rank—such as weights 225.

In FIG. 3 the weight equals the number of test cases having a code coverage that included the overlapping code segments. It should be noted that the weight can be any function of the number of these test cases. It should also be noted that the weight can be determined based on one or more additional parameters.

FIG. 3 also illustrates an example of suggested overlapping code segment tests (denoted "suggested OCST 230"). The suggested OCST 230 is illustrates as a table that provide information regarding the overlapping code segment tests. Column 231 represents the overlapping code segments (the overlapping code segment tests are ordered according to the rank of the overlapping code segments), names 232 of the overlapping code segment tests, inputs 233 to be provided to the overlapping code segments during the OCST, expected outputs 234 to be outputted from the overlapping code segments during the OCST, and weights 225.

It should be noted that the tests can be generated in any manner and can include determining inputs to be provided to the overlapping code segments that can differ from the inputs provided during the execution of the group of test case. Additionally or alternatively, the tests can be generated in any manner and can include determining expected outputs to be provided from the overlapping code segments that can differ from the outputs provided from the overlapping code segments during the execution of the group of test case FIG. 4 illustrates an example of a computerized system 300. Computerized system 300 can include processing circuits, and memory modules. The processing circuits and memory units can be configured to operate (can be constructed and arrange to operate) as a test runner 302, a monitor 304, a test builder 306 and a code evaluator 308.

Each one of the test runner 302, the monitor 304, the test builder 306 and the code evaluator 308 can be implemented by one or more processing circuit, and can be also implemented by one or more memory module (such as a memory bank, a memory chip, a part of a memory bank, a part of a memory chip, and the like).

At least two entities of the test runner 302, the monitor 304, the test builder 306 and the code evaluator 308 can share a processing circuit and/or a memory module. At least two entities of the test runner 302, the monitor 304, the test builder 306 and the code evaluator 308 may not share a processing circuit and/or a memory module.

The test runner 302 is configured to execute a group of test cases. The monitor 304 is configured to perform real time analysis (during the execution of the group of test cases) to find (a) a set of overlapping code segments, (b) input values that are fed, during the executing of the group of test cases, to each one of the set of overlapping code segments, and (c) output values that are outputted from each one of the overlapping code segments during the execution of the group of test cases; wherein each overlapping code segment is independently testable and accessed during an execution of two or more test cases of the group of test cases.

The test builder 306 is configured to generate, for at least some of the overlapping code segments, at least one overlapping code segment test for testing each of the at least some overlapping code segments; wherein the generating is based, at least in part, on (i) the input values that are fed, during the executing of the group of test cases, to the each one of the overlapping code segments, and on (ii) the output values that are outputted from the each one of the overlapping code segments, during the execution of the group of test cases.

The test builder 306 is also configured to determine an evaluation process of the code that comprises executing one or more overlapping code segment tests for testing one or more overlapping code segments.

The test runner 302 can be also configured to execute the evaluation process.

In the foregoing specification, the embodiments of the disclosure has been described with reference to specific examples of embodiments of the disclosure. It will, however, be evident that various modifications and changes can be made therein without departing from the broader spirit and scope of the embodiments of the disclosure as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the disclosure described herein are, for example, capable of operation in other orientations than those illustrated or otherwise described herein.

The connections as discussed herein can be any type of connection suitable to transfer signals from or to the respective nodes, units or devices, for example via intermediate devices. Accordingly, unless implied or stated otherwise, the connections can, for example, be direct connections or indirect connections. The connections can be illustrated or described in reference to be a single connection, a plurality of connections, unidirectional connections, or bidirectional connections. However, different embodiments can vary the implementation of the connections.

For example, separate unidirectional connections can be used rather than bidirectional connections and vice versa. Also, plurality of connections can be replaced with a single connection that transfers multiple signals serially or in a time multiplexed manner. Likewise, single connections carrying multiple signals can be separated out into various different connections carrying subsets of these signals. Therefore, many options exist for transferring signals.

Any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations can be combined into a single operation, a single operation can be distributed in additional operations and operations can be executed at least partially overlapping in time. Moreover, alternative embodiments can include multiple instances of a particular operation, and the order of operations can be altered in various other embodiments.

Also for example, in one embodiment, the illustrated examples can be implemented as circuitry located on a single integrated circuit or within a same device. Alternatively, the examples can be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to embodiments of the disclosure s containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the embodiments of the disclosure have been illustrated and described herein, many modifications, substitutions, changes, and equivalents will now occur to those of ordinary skill in the art. It is, therefore, to be understood that the appended claims are intended to cover all such modifications and changes as fall within the true spirit of the embodiments of the disclosure.

What is claimed is:

1. A method for testing a code using real time analysis, the method comprising:
    executing a group of test cases while performing real time analysis to find: (a) a set of overlapping code segments, (b) input values that are fed, during the executing of the group of test cases, to each one of the set of overlapping code segments, and (c) output values that are outputted from each one of the overlapping code segments during the execution of the group of test cases; wherein each overlapping code segment is independently testable and accessed during an execution of two or more test cases of the group of test cases;

generating, for at least some of the overlapping code segments, at least one overlapping code segment test for testing each of the at least some overlapping code segments; wherein the generating is based, at least in part, on: (i) the input values that are fed, during the executing of the group of test cases, to the each one of the overlapping code segments, and on (ii) the output values that are outputted from the each one of the overlapping code segments, during the execution of the group of test cases, wherein generating the at least one overlapping code segment test comprises feeding an overlapping code segment at least some of the input values that were fed to the group of test cases during the executing step;

determining an evaluation process of the code that comprises executing one or more overlapping code segment tests for testing one or more overlapping code segments;

evaluating the code by executing the evaluation process;

determining expected output values to be outputted during an execution of an overlapping code segment test, based at least in part, on output values that were outputted from the one or more overlapping code segments, during execution of the group of test cases in the executing step; and identifying a test failure if, when the overlapping code segment test is executed, the test output values deviate substantially from the expected output values.

2. The method according to claim 1 further comprising evaluating the code by executing the one or more overlapping code segment tests instead of executing two or more test cases that include the one or more overlapping code segment tests.

3. The method according to claim 1 further comprising evaluating the code by executing the one or more overlapping code segment tests, and upon a failure of the one or more overlapping code segment tests avoiding from executing two or more test cases that include the one or more overlapping code segments.

4. The method according to claim 1 wherein a duration of the executing of one or more overlapping code segment tests is shorter that an aggregate duration of the executing of the two or more test cases.

5. The method according to claim 1 further comprising generating the one or more overlapping code segment tests to comprise feeding to the one or more overlapping code segments at least some of the input values that were fed, during the executing of the group of test cases, to the one or more overlapping code segments.

6. The method according to claim 5 further comprising determining expected output values to be outputted during an execution of the one or more overlapping code segment tests, based at least in part, on output values that were outputted from the one or more overlapping code segments, during the execution of the group of test cases.

7. The method according to claim 1 wherein the at least some of the overlapping code segments are all of the overlapping code segments.

8. The method according to claim 1 wherein the evaluating of the code comprises executing an overlapping code segment test for testing each one of the at least some of the overlapping code segments, wherein the at least some of the overlapping code segments comprise the code segment.

9. The method according to claim 1 wherein the overlapping code segment is a function.

10. The method according to claim 1 further comprising ranking at least some of the overlapping code segments based on numbers of test cases of the group of test cases that once executed accessed the overlapping code segments.

11. The method according to claim 10 wherein the ranking is also based on at least one parameter that differs from the numbers of test cases of the group of test cases that once executed accessed the overlapping code segments.

12. The method according to claim 11 wherein the at least one parameter is a number of bugs found in the test cases of the group.

13. The method according to claim 11 wherein the at least one parameter is priorities assigned to the test cases of the group.

14. The method according to claim 10 further comprising prioritizing an execution of at least some of the overlapping code segments tests based on the ranking of the at least some of the overlapping code segments tested by the at least some of the overlapping code segments tests.

15. The method according to claim 1 wherein the group of test cases comprises all tests cases associated with the code.

16. The method according to claim 1 further comprising executing multiple iterations of the evaluating of the code per each single executing of the group of test cases.

17. The method according to claim 1 wherein the evaluating of the code is included in regression testing of the code.

18. A non-transitory computer readable medium that stores instructions for:

executing a group of test cases while performing real time analysis to find: (a) a set of overlapping code segments, (b) input values that are fed, during the executing of the group of test cases, to each one of the set of overlapping code segments, and (c) output values that are outputted from each one of the overlapping code segments during the execution of the group of test cases; wherein each overlapping code segment is independently testable and accessed during an execution of two or more test cases of the group of test cases;

generating, for at least some of the overlapping code segments, at least one overlapping code segment test for testing each of the at least some overlapping code segments; wherein the generating is based, at least in part, on: (i) the input values that are fed, during the executing of the group of test cases, to the each one of the overlapping code segments, and on (ii) the output values that are outputted from the each one of the overlapping code segments, during the execution of the group of test cases, wherein generating the at least one overlapping code segment test comprises feeding an overlapping code segment at least some of the input values that were fed to the group of test cases during the executing step;

determining an evaluation process of the code that comprises executing one or more overlapping code segment tests for testing one or more overlapping code segments;

evaluating the code by executing the evaluation process;

determining expected output values to be outputted during an execution of an overlapping code segment test, based at least in part, on output values that were outputted from the one or more overlapping code segments, during execution of the group of test cases in the executing step; and identifying a test failure if, when the overlapping code segment test is executed, the test output values deviate substantially from the expected output values.

19. A computerized system that comprises a test runner, a monitor, a test builder, and a code evaluator;

wherein the test runner is configured to execute a group of test cases;

wherein the monitor is configured to perform real time analysis (during the execution of the group of test cases) to find: (a) a set of overlapping code segments, (b) input values that are fed, during the executing of the group of test cases, to each one of the set of overlapping code segments, and (c) output values that are outputted from each one of the overlapping code segments during the execution of the group of test cases; wherein each overlapping code segment is independently testable and accessed during an execution of two or more test cases of the group of test cases;

wherein the test builder is configured to generate, for at least some of the overlapping code segments, at least one overlapping code segment test for testing each of the at least some overlapping code segments; wherein the generating is based, at least in part, on: (i) the input values that are fed, during the executing of the group of test cases, to the each one of the overlapping code segments, and on (ii) the output values that are outputted from the each one of the overlapping code segments, during the execution of the group of test cases, wherein generating the at least one overlapping code segment test comprises feeding an overlapping code segment at least some of the input values that were fed to the group of test cases during the executing step;

wherein test builder is also configured to determine an evaluation process of the code that comprises executing one or more overlapping code segment tests for testing one or more overlapping code segments; and wherein the test runner is also configured to execute the evaluation process;

wherein the code evaluator is configured to determine expected output values to be outputted during an execution of an overlapping code segment test, based at least in part, on output values that were outputted from the one or more overlapping code segments, during execution of the group of test cases in the executing step; and wherein the code evaluator is configured to identify a test failure if, when the overlapping code segment test is executed, the test output values deviate substantially from the expected output values.

* * * * *